United States Patent [19]

Killian

[11] Patent Number: 4,550,485

[45] Date of Patent: Nov. 5, 1985

[54] METHODS AND APPARATUS FOR INSTALLING A RADIALLY APPLIED RETAINING RING INTO AN EXTERNAL GROOVE OF A WORKPIECE

[75] Inventor: Edmund F. Killian, Merrick, N.Y.

[73] Assignee: Waldes Kohinoor, Inc., Long Island City, N.Y.

[21] Appl. No.: 579,559

[22] Filed: Feb. 13, 1984

[51] Int. Cl.[4] ........................ B23P 11/02; B23P 19/04

[52] U.S. Cl. ........................................ 29/450; 29/453; 29/229

[58] Field of Search ................. 29/225, 229, 446, 453, 29/450

[56] References Cited

U.S. PATENT DOCUMENTS

| | | | |
|---|---|---|---|
| 2,978,802 | 4/1961 | Erdmann . | |
| 3,266,133 | 8/1966 | Kalbow | 29/229 |
| 3,448,507 | 6/1969 | Jackson et al. | 29/229 |
| 3,500,529 | 3/1970 | Kohout | 29/229 |
| 3,681,839 | 8/1972 | Janecka . | |
| 3,785,037 | 2/1974 | Erdmann | 29/229 |
| 3,846,900 | 11/1974 | Weglage | 29/229 |

*Primary Examiner*—Howard N. Goldberg
*Assistant Examiner*—Steven Nichols
*Attorney, Agent, or Firm*—Burns, Doane, Swecker & Mathis

[57] ABSTRACT

An applicator for installing a retaining ring into an external groove of a workpiece comprises a base plate forming a ramp. A forward end of the ramp includes a slot for receiving a groove workpiece. A groove locator is mounted on the base plate for movement between a locating position within the groove of the workpiece, and a retracted position. The groove locator is yieldably biased to its locating position. A pusher is mounted for sliding movement along the ramp for pushing a retaining ring forwardly into engagement with a cam face of the locator to cam the locator to its retracted position as the retaining ring enters the groove of the workpiece.

20 Claims, 9 Drawing Figures

FIG. 5
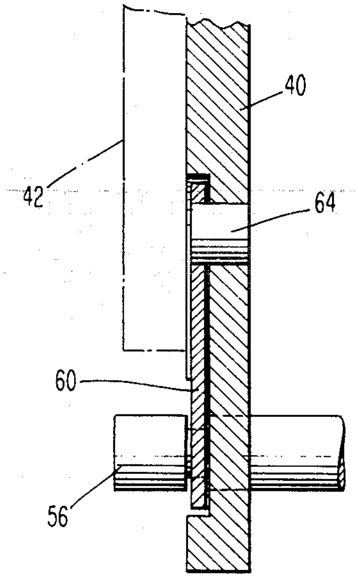
FIG. 9
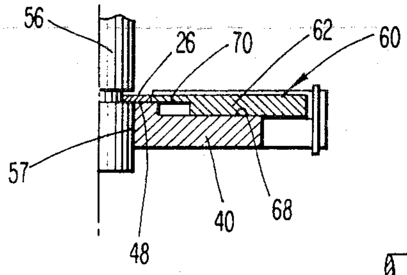
FIG. 6
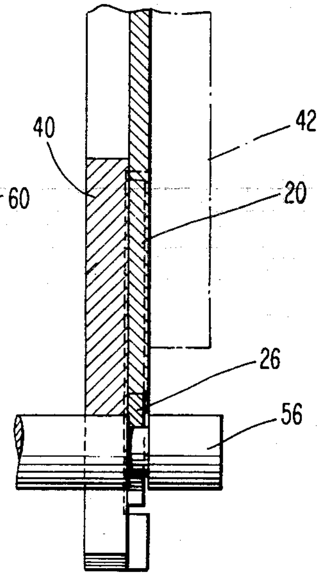
FIG. 7
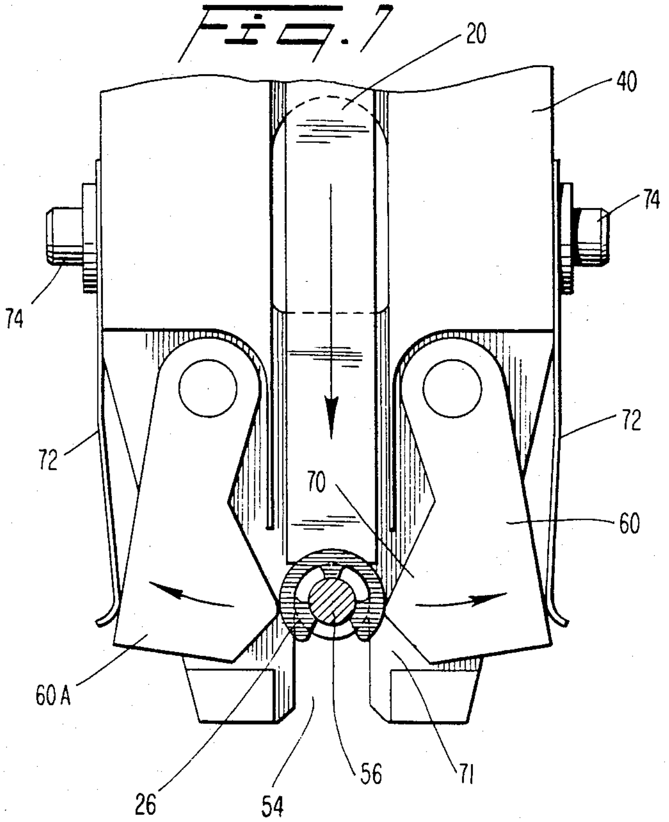
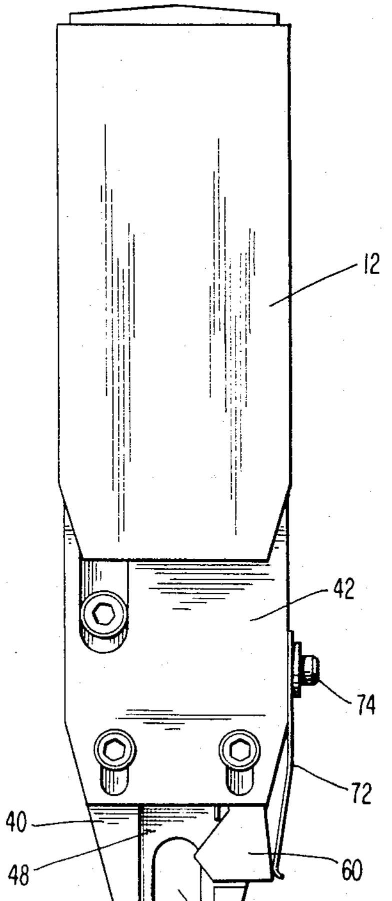
FIG. 8

METHODS AND APPARATUS FOR INSTALLING A RADIALLY APPLIED RETAINING RING INTO AN EXTERNAL GROOVE OF A WORKPIECE

BACKGROUND AND OBJECTS OF THE INVENTION

The present invention relates to hand applicators for installing radially assembled spring retaining rings and, in particular, for installing radially assembled spring retaining rings into external grooves of workpieces.

Radially assembled spring retaining rings, such as the type disclosed in Wurzel U.S. Pat. No. 3,595,123 issued July 27, 1971, have long been employed as stop or limiting elements on machined parts. Retaining rings of this type are installed in external grooves formed in the parts. Externally applied retaining rings are installed in external grooves by pushing the open side of the ring against the groove, causing the ring ends to separate. When the thus-expanded ring has fully entered the groove, the ring ends snap-back to secure the ring in place.

In order to facilitate the installation of radially-applied rings, it has been proposed to employ a hand applicator which forcefully inserts a ring into a groove of a machine part. Hand-held applicators have been proposed, for example, in Erdman U.S. Pat. No. 2,978,802 issued Apr. 11, 1961 and Janecka U.S. Pat. No. 3,681,839 issued Aug. 8, 1972.

In addition, the assignee of the present invention has heretofore marketed an applicator which comprises a hand-held housing on which is mounted a magazine and a nose assembly. The nose assembly contains a ramp along which retaining rings can be pushed, and a forwardly open slot for receiving a workpiece such as a shaft, the width of the slot being equal to the diameter of the shaft. The magazine feeds retaining rings to the ramp one-at-a-time. The housing carries a pusher and a fluid-driven mechanism for reciprocating the pusher when the user activates a trigger on the housing. When the pusher travels forwardly, it pushes a retaining ring into a groove on the workpiece. It can occur, however, that the groove is not properly aligned with the ramp, whereupon the ring can be installed in a skewed condition, i.e., partly in the groove and partly out of the groove. Such an improper installation, if not detected, may lead to failure. Even if the improper installation is detected, it is inconvenient and time-consuming to rectify, a disadvantage which is especially troublesome on an assembly line where delays are not easily tolerated.

In the above-mentioned Janecka and Erdman patents a groove locator finger is provided such that the locator finger passes through the workpiece groove as the workpiece is being received in a slot of the applicator. This is intended to align the groove with a retaining ring located in the slot. Thus, as the applicator continues to be advanced relative to the workpiece, the locator finger moves out of the groove and thereafter the retaining ring is pushed into the vacated groove. The locator finger of the Erdman patent is made yieldable so as to be able to yield outwardly when the shaft and installed ring are removed from the slot (see FIGS. 8-11 of the Erdmann patent).

In order for the applicators of the above-described type to function acceptably, the manipulation of the applicators must be performed in such a manner that the groove and retaining ring do not become misaligned during the instant after the locator finger leaves the groove and before the retaining ring enters the groove. Otherwise, the ring could become installed in a skewed fashion.

It is, therefore, an object of the present invention to minimize or obviate problems of the above-discussed type.

Another object is to provide a novel applicator for installing retaining rings into external grooves of workpieces.

An additional object is to provide such an applicator and method which assures that the guide finger, or groove locator, will not leave the groove before the ring has been advanced sufficiently to prevent improper installation.

A further object is to provide such an applicator and method wherein the ring itself cams the locator out of the workpiece groove as the ring is being installed in the groove.

SUMMARY OF THE INVENTION

These objects are achieved by the present invention which relates to an applicator for installing a retaining ring into an external groove in a workpiece. The applicator comprises a base plate forming a ramp along which a retaining ring may travel. A forward discharge end of the ramp includes a forwardly open slot for receiving a grooved workpiece. A groove locator is mounted on the base plate for movement relative to the ramp between a locating position and a retracted position. The groove locator is arranged to project into the path of the ramp and into the groove of the workpiece when the locator is in its locating position. The locator includes a rearwardly facing cam face. A biasing member yieldably urges the locator toward the locating position. The biasing member is yieldable to allow the locator to be cammed to its retracted position. A pusher is mounted for sliding movement along the ramp and relative to the base plate for pushing a retaining ring forwardly along the ramp and into engagement with the cam face to cam the locator to its retracted position as the retaining ring enters the groove of the workpiece.

Preferably, the cam face is oriented such that the locator is not displaced fully out of the groove until a portion of the ring has entered the groove.

If desired, an additional locator may be arranged to engage an opposite side of the workpiece groove.

In a method aspect of the present invention, a workpiece is positioned within a forwardly open slot of a base plate of an applicator such that a movable locator on the base plate projects into a groove of the workpiece. The workpiece is retained against side surfaces of the slot which are spaced apart by a distance corresponding to a non-grooved diameter of the workpiece, so that the workpiece does not skew relative to the slot. A retaining ring is positioned within a channel aligned with the slot such that an open side of the retaining ring faces the workpiece.

A pusher is slid forwardly within the channel and relative to the base plate to push the retaining ring forwardly into engagement with a cam surface of the locator to cam the latter out of the groove against a spring-bias as the retaining ring enters the groove.

THE DRAWING

The objects and advantages of the invention will become apparent from the following detailed description of preferred embodiments thereof in connection with the accompanying drawings in which like numerals designate like elements, and in which:

FIG. 5 is a sectional view taken along the line 5—5 in FIG. 3;

FIG. 6 is a sectional view taken along the line 6—6 in FIG. 4;

FIG. 7 is a view of a modified form of the invention wherein a pair of locators is provided, and after the retaining ring has pushed both locators out of the groove of the workpiece;

FIG. 8 is a plan view of the applicator depicted in FIG. 1; and

FIG. 9 is a sectional view taken along the line 9—9 in FIG. 4.

DETAILED DESCRIPTION OF PREFERRED EMBODIMENTS OF THE INVENTION

Figure 1:
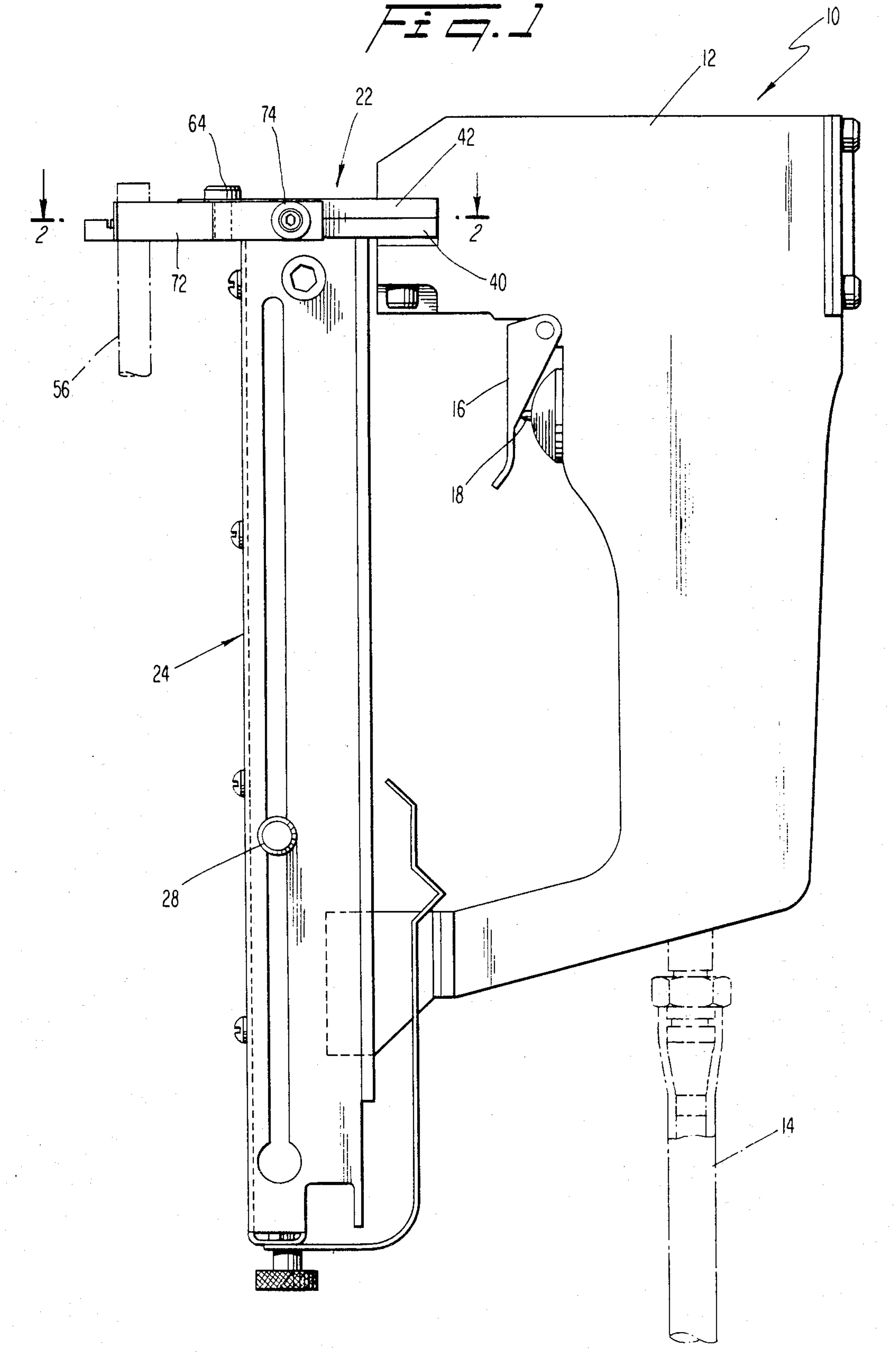
FIG. 1 is a side elevational view of an applicator for installing retaining rings according to the present invention, with a workpiece being depicted in phantom lines.
Figures 2, 3, 4:
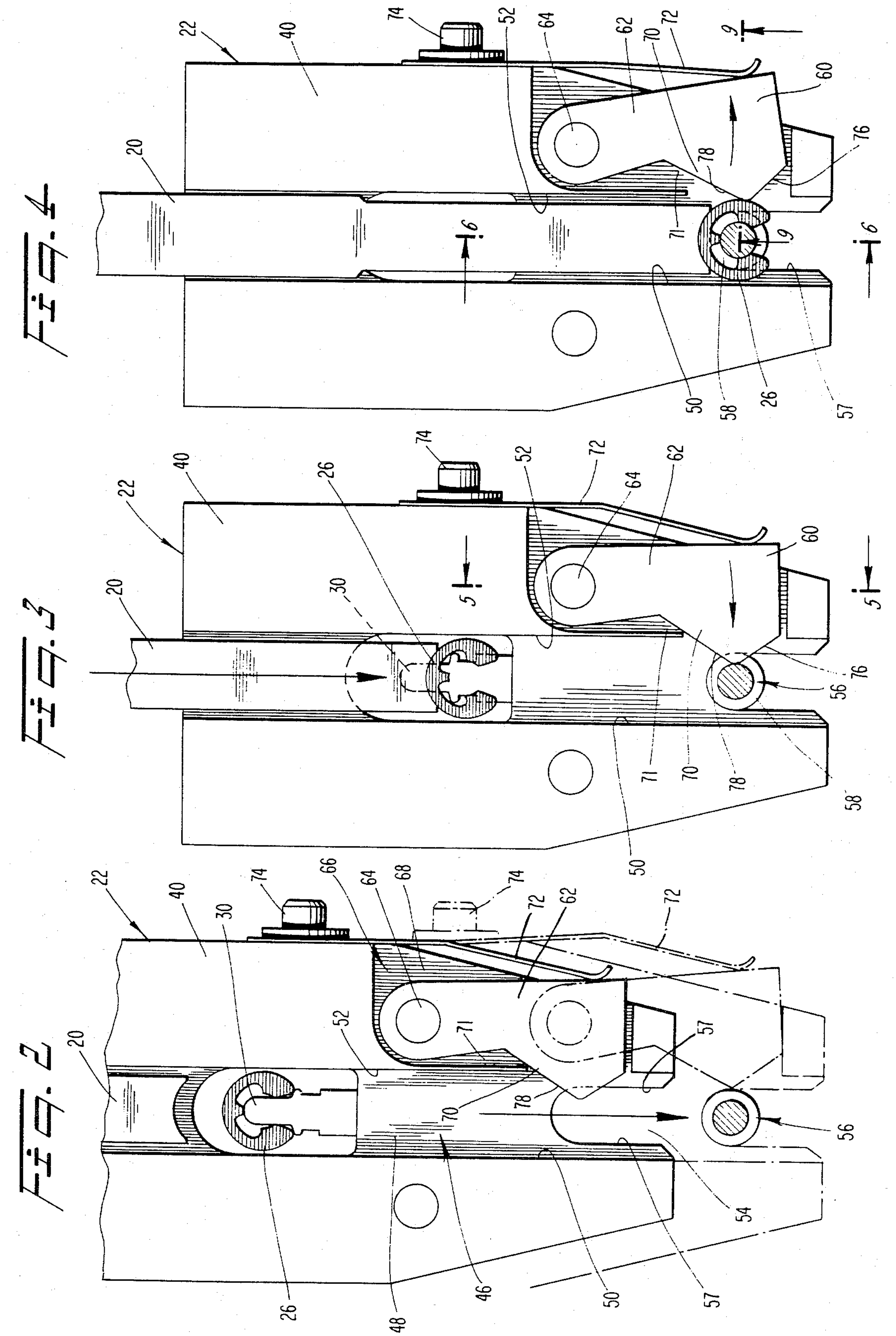
FIG. 2 is a cross-sectional view taken along the line 2—2 in FIG. 1, depicting in solid lines a nose assembly as it is being inserted onto a workpiece, the broken line portion depicting the nose assembly after the workpiece has entered the slot, and with the locator being oriented in a non-aligned relationship with the groove of the workpiece.
FIG. 3 is a view similar to FIG. 2 after the groove of the workpiece has been aligned with the locator, and as a pusher member makes initial contact with a retaining ring located in the nose assembly.
FIG. 4 is a view similar to FIG. 3 after the pusher has pushed the retaining ring into the groove of the workpiece, and after the retaining ring has cammed the locator out of the groove of the workpiece.

An applicator 10 for installing retaining rings is depicted in FIG. 1. The applicator comprises a hand-held gun or housing 12 which contains a fluid-driven mechanism of a conventional type. The mechanism is driven by fluid, preferably air, delivered through an inlet hose 14. A manual trigger 16 is connected to the housing for depressing an actuator pin 18. The pin 18, when depressed, activates the mechanism to reciprocate a pusher slide 20 (FIG. 2). A gun of the above-described type is conventional and is marketed by the Duo-Fast Corp. of Franklin Park, Ill.

Mounted on the housing are a nose assembly 22 and a magazine, the latter carrying a stack of retaining rings 26 (FIG. 2). The magazine includes a spring-biased arm 28 which underlies the stack of retaining rings and urges the stack upwardly into the nose assembly 22. The retaining rings are slidably mounted upon a rail 30 (FIG. 2) disposed within the magazine. The rail terminates at the nose assembly so that the uppermost ring can be "picked-off" the stack of the pusher 20.

The nose assembly 22 comprises a base plate 40, and a cover plate 42 overlying the base plate 40. An opening 44 in the base plate 40 communicates with the magazine and is aligned with the rail 30, such that the uppermost ring 26 in the stack of rings is pushed through the opening 44 and against the top plate 42 and is retained in that position, as depicted in FIG. 1.

The base plate includes a longitudinally extending channel 46 which includes a floor or ramp 48 along which a picked-off retaining ring is pushed by the pusher 20. The channel 46 also includes side walls 50, 52 bordering the ramp 48. The ramp 48 terminates at its forward end in the form of a slot 54 which is sized to receive a workpiece or machine part, such as a shaft 56 which includes a groove 58 in which a retaining ring 26 is to be installed. The diameter of the groove 58 substantially equals the width of the slot 54, whereby the workpiece 56, when disposed within the slot 54 is retained against skewing by means of two opposing side faces 57 of the slot. The width of the groove, i.e., its dimension parallel to the shaft axis, corresponds to the thickness of the ring 26.

The applicator as thus far described, is similar to that which has been previously marketed by the assignee of the present invention and which was discussed in the background portion of the present specification.

In accordance with the present invention, a groove locator 60 is mounted on the nose assembly adjacent a forward end thereof. The groove locator 60 includes a body 62 pivotably mounted to the base plate 40 by a pin 64. The locator 60 rotates about the axis of the pin 64, which axis is disposed perpendicularly to the plane of the ramp 48. The body 62 of the locator 60 is disposed within a pocket 66 of the base plate, the floor 68 of which pocket extends more deeply in the base plate than the ramp 48, as is evident from FIG. 9. The locator 60 includes a finger 70 which projects from an upper portion of the base 62 and is thus situated above the floor 68 of the pocket 66. The finger 70 is coplanar with the channel 46 and projects into the channel 46 through a gap 71 in the side wall 52. Accordingly, the finger can enter the groove 58 to align the latter with the ring 26 when the workpiece is disposed within the slot.

A spring 72 in the form of a spring strip is mounted on the base plate 40 by a bolt 74 and extends forwardly in cantilever fashion to bear against the locator 60. The spring 62 yieldably urges the locator 60 toward the channel 46 such that the finger 70 normally extends across the workpiece-receiving slot 54 and is thus normally disposed in the path of travel of the pusher 20 and a retaining ring 26 pushed thereby. In this manner, the finger 70 will be engaged by the retaining ring 26 as the latter is being pushed into the groove 58.

The finger 70 includes front and rear cam surfaces 76, 78 which are each inclined at an acute angle relative to the longitudinal direction of the ramp. The front cam surface 76 allows the locator 60 to be retracted, i.e., pushed outwardly (away from the ramp) in response to the shaft 56 being received in the slot 54. The rear cam surface 78 enables a retaining ring 26 to push the locator 60 outwardly as the retaining ring 26 is being installed within the groove 58 of the shaft 56. The rear cam surface 76 is preferably configured such that the finger 70 does not fully leave the groove 58 until a leading end of the ring has entered the groove.

IN OPERATION, the nose assembly 22 is oriented such that the slot 54 is aligned with the shaft 56. The slot is then pushed onto the shaft. When the shaft reaches the inner end of the slot, the forward cam surface 76 of the finger is engaged by the wall of the groove 58 of the shaft whereby the locator is cammed slightly outwardly against the force of the spring 72. As a result, the finger 70 is disposed within the groove 58 to assure that the pusher 20 is aligned with the groove 58. If the finger 70 is not aligned with the groove 58 when the slot is pushed onto the shaft, as depicted in broken lines in FIG. 2, it is merely necessary to move the nose assembly 22 in the direction of the shaft axis until the finger 70 enters the groove 58 (FIG. 3).

The slot 54 is stable relative to the shaft 56 since the width of the slot corresponds to the shaft diameter.

Thus, the shaft axis will remain positioned substantially perpendicular with the plane of the ramp 48, i.e., the plane defined by the groove 58 will remain parallel with the plane of the ramp 48.

The trigger 16 is then actuated to cause the pusher to be displaced forwardly to push the uppermost retaining ring 26 into engagement with the rear cam surface 78 of the finger 70. During continued forward travel of the pusher 20, the retaining ring 26 enters the groove while pushing the locator 60 outwardly from the groove 58 (FIG. 4). Finally, the nose assembly is pulled away from the shaft, leaving the ring 26 mounted thereon.

It is also possible to employ an additional identical locator 60A disposed to engage a diametrically opposite portion of the groove 58 in the shaft 56, as depicted in FIG. 7. In such a case, the retaining ring 26 cams-out both of the locators 60, 60A.

It will be appreciated that in use of an applicator according to the present invention, the ring itself pushes the locator out of the workpiece groove as the ring is being installed. Accordingly, the chances that the ring can become skewed relative to the groove are minimized.

Although the present invention has been described in connection with preferred embodiments thereof, it will be appreciated by those skilled in the art that modifications, substitutions, additions and deletions not specifically described, may be made without departing from the spirit and scope of the invention as defined in the appended claims.

What is claimed is:

1. An applicator for installing a radially assembled spring retaining ring into an external groove in a workpiece, said applicator comprising:

a base plate forming a ramp along which a retaining ring may travel, a forward discharge end of said ramp including a forwardly open slot for receiving a grooved workpiece, a groove locator mounted on said base plate for movement relative to said ramp between a locating position and a retracted position, said groove locator being arranged to project into the path of said ramp and into the groove of the workpiece when said locator is in said locating position, said locator including a rearwardly facing cam face, biasing means for yieldably urging said locator toward said locating position, said biasing means being yieldable to allow said locator to be cammed to said retracted position, and pusher means mounted for sliding movement along said ramp and relative to said base plate for pushing a retaining ring forwardly along said cam face to cam said locator to said retracted position as the retaining ring enters the groove of the workpiece.

2. An applicator according to claim 1, wherein said cam face is oriented such that said locator is not displaced fully out of the groove until a portion of said ring has entered the groove.

3. An applicator according to claim 1, wherein said locator is pivotably mounted on said base for rotation about an axis extending perpendicularly to the plane of said ramp.

4. An applicator according to claim 3, wherein said biasing means comprises a leaf spring bearing against said locator.

5. An applicator according to claim 1, wherein said ramp is recessed within said base plate, there being a pair of side walls bordering said ramp.

6. An apparatus according to claim 5, wherein said base plate includes a pocket disposed adjacent said ramp and having a floor disposed more deeply within said base plate than said ramp, said locator including a projection disposed above said floor and arranged to extend through a gap in one of said side walls to slide upon said ramp and to enter the groove in the workpiece.

7. An apparatus according to claim 1, wherein said slot has a width corresponding to a non-grooved diameter of said workpiece.

8. An apparatus according to claim 1, wherein said locator includes a forwardly facing cam face enabling said locator to be retracted by a workpiece as said ramp receives the workpiece.

9. An apparatus according to claim 1 including an additional locator arranged to engage an opposite side of the workpiece groove.

10. In an applicator for installing a retaining ring into a groove in a workpiece, said applicator being of the type comprising a housing, a nose assembly mounted on said housing and including a base plate and a top plate overlying said base plate, said base plate forming a ramp along which a retaining ring may travel, a forward end of said ramp forming a forwardly open slot having a width corresponding to the non-grooved diameter of the workpiece, said ramp having an opening therein, a magazine mounted on said housing and communicating with said opening, said magazine being adapted to carry a supply of split retaining rings for introduction into said ramp through said opening, and a fluid-driven pusher carried by said housing and arranged for reciprocable movement along said ramp to pick-off a retaining ring at said opening and push it forwardly toward the workpiece disposed in said slot, the improvement comprising:

a groove locator mounted on said base plate for movement relative to said base plate and said ramp between a locating position and a retracted position, said groove locator including a projection which projects into the path of said ramp and into the groove of the workpiece when said locator is in said locating position, said projection including a rearwardly facing cam face, biasing means for yieldably urging said locator toward said locating position, said biasing means being yieldable to allow said locator to be cammed to said retracted position by a retaining ring as the latter is pushed into the groove of the workpiece by said pusher.

11. An applicator according to claim 10, wherein said cam face is oriented such that said locator is not displaced fully out of the groove until a portion of said ring has entered the groove.

12. An applicator according to claim 10, wherein said locator is pivotably mounted on said base for rotation about an axis extending perpendicularly to the plane of said ramp.

13. An applicator according to claim 12, wherein said biasing means comprises a leaf spring bearing against said locator.

14. An applicator according to claim 10, wherein said ramp is recessed within said base plate, there being a pair of side walls bordering said ramp.

15. An apparatus according to claim 14, wherein said base plate includes a pocket disposed adjacent said ramp and having a floor disposed more deeply within said base plate than said ramp, said locator including a projection disposed above said floor and arranged to extend through a gap in one of said side walls to slide upon said ramp and to enter the groove in the workpiece.

16. An apparatus according to claim 10, wherein said slot has a width corresponding to a non-grooved diameter of said workpiece.

17. An apparatus according to claim 10, wherein said locator includes a forwardly facing cam face enabling said locator to be retracted by a workpiece as said ramp receives the workpiece.

18. An apparatus according to claim 10 including an additional locator arranged to engage an opposite side of the workpiece groove.

19. A method of installing a retaining ring into a grooved workpiece comprising the steps of:

positioning said workpiece within a forwardly open slot of a base plate of an applicator such that a movable locator on said base plate projects into a groove of said workpiece, retaining said workpiece against side surfaces of said slot which are spaced apart by a distance corresponding to a non-grooved diameter of said workpiece, so that said workpiece does not skew relative to said slot, positioning a retaining ring within a channel aligned with said slot such that a split side of said ring faces said workpiece, and sliding a pusher forwardly within said channel and relative to said base plate to push said retaining ring forwardly into engagement with a cam surface of said locator to cam the latter out of said groove against a spring bias as said retaining ring enters said groove.

20. A method according to claim 19, wherein said locator does not fully leave said groove until said ring has entered said groove

* * * * *